United States Patent [19]

Westwood et al.

[11] 4,029,499

[45] June 14, 1977

[54] RECOVERY OF GALLIUM

[75] Inventors: Walter Westwood; John James MacGregor; John Blunden Payne, all of London, England

[73] Assignee: Johnson Matthey & Co., Limited, London, England

[22] Filed: July 3, 1975

[21] Appl. No.: 592,863

[30] Foreign Application Priority Data

July 10, 1974 United Kingdom ............ 30490/74

[52] U.S. Cl. .............................. 75/109; 75/101 R; 75/121; 423/127; 423/131
[51] Int. Cl.² .......................................... C22B 58/00
[58] Field of Search ................. 75/109, 121, 101 R; 423/127, 131

[56] References Cited

UNITED STATES PATENTS

| | | | |
|---|---|---|---|
| 328,478 | 10/1885 | Freist | 423/121 |
| 1,422,004 | 7/1922 | Sherwin | 423/121 |
| 1,826,895 | 10/1931 | Muller et al. | 423/127 X |
| 2,574,008 | 11/1951 | Beja | 423/127 X |
| 3,094,378 | 6/1963 | Wolf | 75/121 X |
| 3,144,304 | 8/1964 | Nagumo et al. | 75/121 X |
| 3,170,857 | 2/1965 | Dotzer | 75/121 X |
| 3,890,427 | 6/1975 | Dewey et al. | 423/129 |

*Primary Examiner*—G. Ozaki
*Attorney, Agent, or Firm*—Cushman, Darby & Cushman

[57] ABSTRACT

This invention relates to an improvement in the well known "Bayer" process. In particular, the invention describes a process for the recovery of gallium and alumina from bauxite including the steps of:

a. dissolving the ore in caustic soda solution under pressure;
b. precipitation of pure alumina from the remaining caustic soda solution by reduction of temperature and pressure;
c. subjecting the resulting mother liquor from (b) to an elevated temperature of 60° to 450° C and a pressure of 2 to 100 atmos. in the presence of an oxygen-containing atmosphere; and
d. cementation of the gallium remaining in solution by contact with metallic aluminium.

Step (a) is preferably carried out at a pressure of 5 atmospheres and step (c) is carried out in the presence of an atmosphere consisting substantially of oxygen at a pressure within the range 20 to 50 atmospheres and a temperature within the range 150° to 350° C. The metallic aluminium used in step (d) is preferably in the form of turnings or coarse filings.

7 Claims, No Drawings

RECOVERY OF GALLIUM

This invention relates to improvements in the "Bayer" process for the purification of naturally occurring alumina and to an improvement in the process for the recovery of gallium which is present in bauxite.

The Bayer process for the purification of naturally occurring alumina in bauxite comprises dissolving the bauxite under pressure in caustic soda solution, removing undissolved impurities and then precipitating pure alumina from the solution at atmospheric pressure. Soluble impurities are left in the mother liquor, which is recycled continuously. Small amounts of gallium in the bauxite are dissolved and most of this gallium remains in solution when the pure alumina is precipitated. The gallium concentration in the re-cycled liquor thus builds up to an equilibrium level, at about 0.2 grams per litre and represents a fifty-fold increase in concentration compared with the gallium level in the original bauxite.

In the aluminium industry gallium is frequently recovered using electrolysis where the gallium is collected in a mercury cathode. The current efficiency of such recovery is very low and the high cost and environmental hazard produced by the use of mercury are objections to this process. An easy, cheap method for the recovery of gallium which would leave the liquor in a state suitable for re-use would be to precipitate the gallium by cementation with aluminium. However, although by this process gallium can be recovered from pure caustic aluminate solution, the process does not work in a satisfactory manner when actual Bayer recovery liquors are used.

Accordingly, it is an object of the present invention to recover gallium from the Bayer process mother liquor by a method having improved efficiency and whereby the mother liquor remains fit for re-use after the gallium removal.

According to one aspect of the present invention a process for the recovery of gallium and alumina from bauxite ore comprises the steps of:
a. dissolving the ore in caustic soda solution under pressure;
b. precipitation of pure alumina from the caustic soda solution by reduction of temperature and pressure;
c. subjecting the resulting mother liquor from (b) to an elevated temperature of 60° to 450° C and a pressure of 2 to 100 atmos. in the presence of an oxygen-containing atmosphere; and
d. cementation of the gallium remaining in solution by contact with metallic aluminium.

In preferred features of the above described invention, step (a) is preferably carried out at 5 atmospheres, step (c) is preferably carried out in the presence of an atmosphere consisting substantially of oxygen at a pressure within the range 20 to 50 atmospheres and a temperature within the range 150° to 350° C. The metallic aluminium used in step (d) is preferably in the form of turnings or coarse filings.

Preferably steps (a) and (b) are repeated several times by re-cycling the mother liquor from step (b) to step (a) before steps (c) and (d) are carried out. This has the effect of building up the concentration of gallium in the caustic soda solution by repeated contact with the raw bauxite. After sufficient re-cycling (for example 5 to 10 cycles) has been carried out, steps (c) and (d) are performed.

EXAMPLE

In one example bauxite ore was dissolved in caustic soda solution at 5 atmospheres and then placed in an autoclave under an oxygen atmosphere at 45 atmospheres for 4 hours at 240° C. Cementation by aluminium turnings subsequently was found to precipitate over 90% of the gallium present in solution. The remaining liquor was satisfactory for re-cycling in the Bayer process.

What we claim is:
1. A process for the recovery of gallium and alumina from bauxite ore comprising the steps of:
    a. dissolving the ore in caustic soda solution under pressure;
    b. precipitating alumina from the remaining caustic soda solution by reduction of temperature and pressure;
    c. subjecting the resulting mother liquor from (b) to an elevated temperature of 60° to 450° C and a pressure of 2 to 100 atmos. in the presence of an oxygen-containing atmosphere; and
    d. cementation of the gallium remaining in solution by contact with metallic aluminium.

2. A process according to claim 1, wherein step (a) is carried out at a pressure of 5 atmospheres.

3. A process according to claim 1, wherein step (c) is carried out in an atmosphere consisting substantially of oxygen at a pressure within 20 to 50 atmospheres and at a temperature of 150° to 350° C.

4. A process according to claim 1, wherein steps (a) and (b) are repeated by re-cycling the mother liquor before carrying out steps (c) and (d).

5. A process according to claim 1, wherein cementation of the gallium in step (d) is carried out in the presence of turnings or coarse fillings of metallic aluminium.

6. In the process of recovering gallium from the sodium aluminate liquor of the Bayer aluminum oxide process for recovering alumina from aluminum ores by contacting the liquor with metallic aluminum, the improvement comprising heating the liquor to an elevated temperature of 60° C to 450° C and a pressure of 2 to 100 atmospheres in the presence of an oxygen-containing atmosphere and thereafter contacting the liquor with metallic aluminum.

7. A process as in claim 6 wherein the atmosphere consists substantially of oxygen at a pressure of 20 to 50 atmospheres and wherein the liquor is heated to a temperature of 150° C to 350° C.

* * * * *